(12) United States Patent
Zhang et al.

(10) Patent No.: US 11,309,673 B2
(45) Date of Patent: Apr. 19, 2022

(54) SLIP RING SYSTEM FOR HIGH SPEED APPLICATIONS

(71) Applicant: Princetel, Inc., Hamilton, NJ (US)

(72) Inventors: Hong Zhang, Hamilton, NJ (US); Joe Ritacco, Hamilton, NJ (US); Boying B Zhang, Hamilton, NJ (US)

(73) Assignee: PRINCETEL, INC., Hamilton, NJ (US)

( * ) Notice: Subject to any disclaimer, the term of this patent is extended or adjusted under 35 U.S.C. 154(b) by 412 days.

(21) Appl. No.: 16/548,743

(22) Filed: Aug. 22, 2019

(65) Prior Publication Data

US 2021/0057860 A1    Feb. 25, 2021

(51) Int. Cl.
| | |
|---|---|
| *H01R 39/08* | (2006.01) |
| *H02K 13/00* | (2006.01) |
| *G02B 6/36* | (2006.01) |
| *H01R 9/05* | (2006.01) |

(52) U.S. Cl.
CPC ............... *H01R 39/08* (2013.01); *G02B 6/36* (2013.01); *G02B 6/3604* (2013.01); *H01R 9/05* (2013.01); *H02K 13/003* (2013.01)

(58) Field of Classification Search
CPC ........ H01R 39/08; H01R 39/02; H01R 39/00; H01R 9/05; H01R 9/03; H01R 9/00; H02K 13/003; G02B 6/38; G02B 6/3604
USPC ........................................................ 439/583
See application file for complete search history.

(56) References Cited

U.S. PATENT DOCUMENTS

| 4,687,899 | A | * | 8/1987 | Acheson | ................ B23K 9/048 |
|---|---|---|---|---|---|
| | | | | | 219/125.11 |
| 6,907,161 | B2 | | 6/2005 | Bowman | |
| 6,980,714 | B2 | | 12/2005 | Lo | |
| 8,121,448 | B2 | * | 2/2012 | Wetzel | ................ H04B 10/801 |
| | | | | | 385/26 |
| 8,611,753 | B2 | | 12/2013 | Lo | |
| 9,263,838 | B1 | * | 2/2016 | Zhang | ................ H01R 13/6473 |
| 10,133,006 | B1 | * | 11/2018 | Zhang | .................. H01R 39/643 |
| 10,236,741 | B2 | * | 3/2019 | Sorensen | .............. H01R 39/385 |
| 11,056,849 | B2 | * | 7/2021 | Sixt | ........................ H01R 39/58 |
| 2012/0020615 | A1 | * | 1/2012 | Zhang | .................. G02B 6/3604 |
| | | | | | 385/26 |
| 2012/0043580 | A1 | * | 2/2012 | Yamazaki | ......... H01L 29/78621 |
| | | | | | 257/99 |
| 2021/0057860 | A1 | | 2/2021 | Zhang | |
| 2021/0057861 | A1 | * | 2/2021 | Zhang | .................. G02B 6/3604 |
| 2021/0215883 | A1 | * | 7/2021 | Zhang | ...................... H01P 3/16 |

* cited by examiner

*Primary Examiner* — Harshad C Patel
(74) *Attorney, Agent, or Firm* — Klein, O'Neill & Singh, LLP

(57) ABSTRACT

The current invention is regarding an electrical slip ring system for high speed applications, which require slip rings to operate at speeds more than 60,000 RPM. It consists of multiple single stage slip rings and multiple gear devices, where all the stators, except the last one, are rotational. The speed limit on the slip ring market, by using the advanced fiber brush bundles, is about 10,000 RPM without cooling, or lubricating. The basic idea is that by designing gears, we can always can make sure the relative speed between the rotor and the stator in each stage is <=10000 rpm.

7 Claims, 3 Drawing Sheets

SLIP RING SYSTEM FOR HIGH SPEED APPLICATIONS

BACKGROUND OF THE INVENTION

It is well known that electrical slip rings are electromechanical devices that consist of rotational (rotors) and stationary (stators) members. They allow the transmission of electrical signals and power from their rotors to stators or vise verse.

The present invention relates generally to an electrical slip ring, and more particularly if the rotational speed between said rotational (rotors) and stationary (stators) members is very high (up to 60000 rpm).

A conventional electrical slip ring consists of conductive rings and brushes. Said rings are mounted on said rotor and insulated from it. Said brushes are usually fixed on said stators and run in contact with said rings, rubbing against the peripheral surfaces of the rings, transferring electrical power or signals to the stator side.

Modern metal fiber brush technology offers significant improvement over traditional carbon brushes in both data and power transmissions, offering extended brush and slip ring service life, high current capacity, and significant decreases in service acoustics and electrical noise. The fiber brushes are multiple of hair-thin metal filaments which on one end are collimated by and terminated into a metal tube, while another free, un-terminated end runs in contact on the ring surface. However, the sliding contact between the rings and brushes during this continuous rotation of the rotor causes the wear on the rings and fiber brushes and generates heat, and even noise in the system, especially in the case of high RPM applications. The speed limit on the slip ring market, is about 10,000 RPM without cooling, or lubricating. The highest speed of slip rings on the market could be up to 20,000 RPM under a cooling, or lubricating system.

In some special applications, such as in high speed permanent magnet generators, in turbine engines, a slip ring may be required to operate at speeds up to 60,000 RPM.

SUMMARY OF THE INVENTION

The objective in the current invention is to provide a slip ring assembly for high speed applications, which require slip rings to operate at speeds more than 60,000 RPM.

DETAIL DESCRIPTION OF THE INVENTION

Figure 1A:
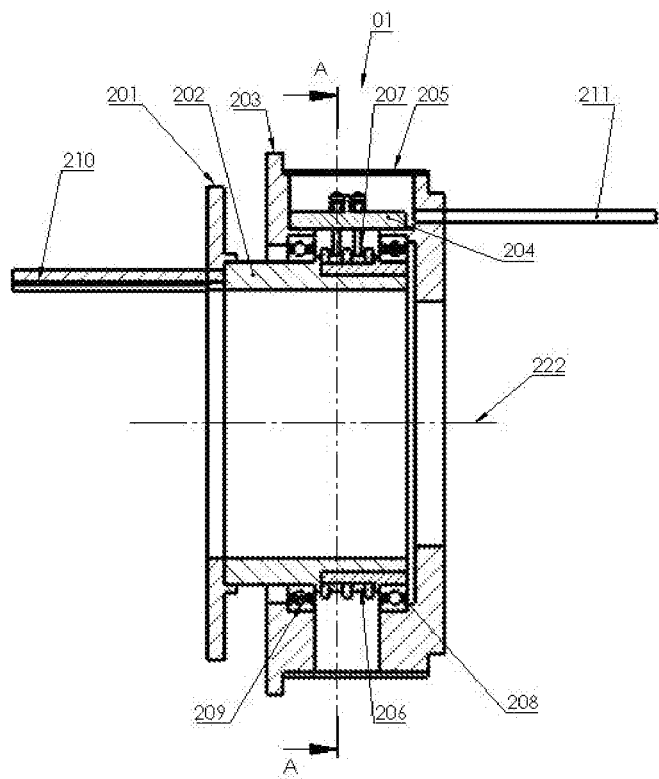
FIG. 1a, FIG. 1b shows the typical configuration of a single stage slip ring assembly.
Figure 1B:
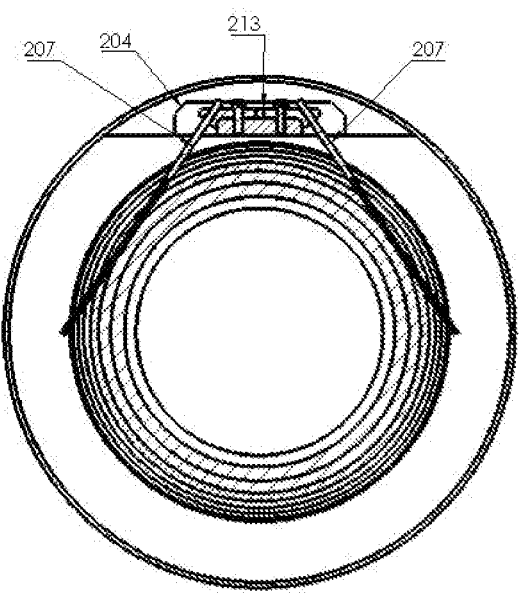
Figure 2:
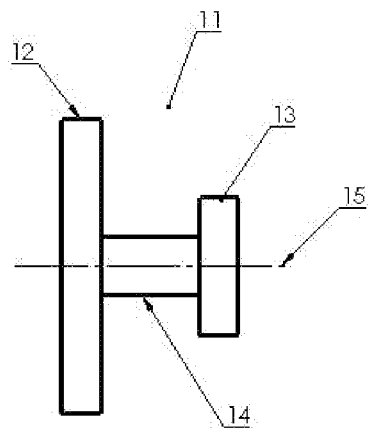
FIG. 2 shows a dual-gear assembly.

A detailed explanation of the preferred embodiment in the present invention with reference to FIG. 1a, FIG. 1b and FIG. 2, is as follows.

FIG. 1a, FIG. 1b shows the typical configuration of a single stage slip ring assembly 01. Said slip ring assembly 01 consists of rotor 202 and stator 205. They are relatively rotational through ball bearings 208 and 209 around the axis 222. The ring 206 is mounted on said rotor. The quantity of rings can be any number. A pair of fiber brush bundles 207 is mounted on brush block 204 through bussbar 213. Said ring 206, fiber brush bundle 207, and bussbar 213 are made of conductive materials. Said brush block 206 is fixed on said stator 205. Cable 210 and 211 are soldered on said ring 206 and said brush bundle 207 respectively. Said brush bundle 207 is in contact on the outer surface of said ring 206 to transmit electrical signals, power to said cable 211 from cable 210, or from cable 211 to cable 210 bi-directionally. Said stator 205 has a driven gear 203. Said rotor 202 has a driving gear 201. As stated before, the speed limit for a single stage slip ring is about 10,000 RPM without cooling, or lubricating.

FIG. 2 shows a dual-gear assembly 11. Said dual-gear assembly 11 consists of gear 12, gear 13, and shaft 14. Said gear 12 and gear 13 are fixed on said shaft 14. Said gear 12, gear 13, and shaft 14 are rotational around axis 15.

Figure 3:
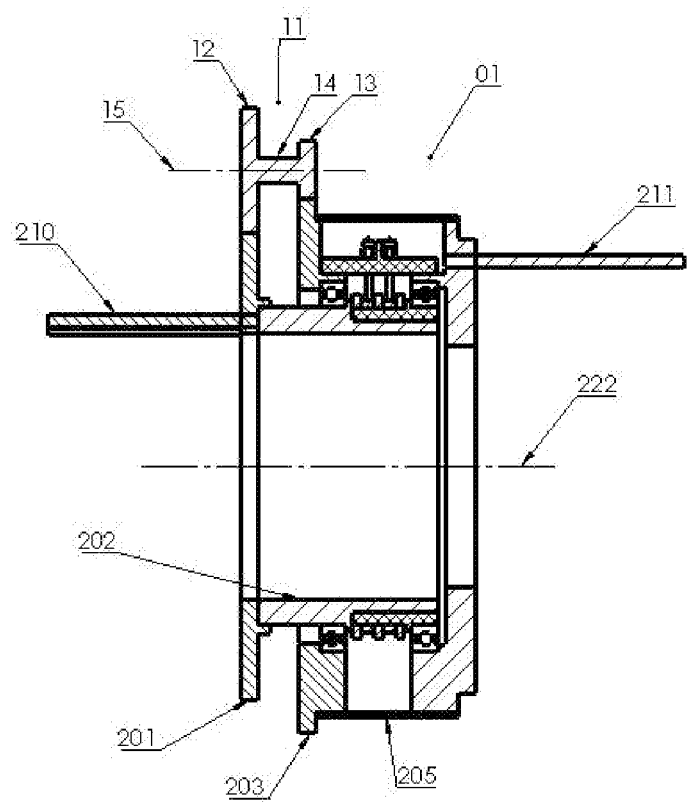
FIG. 3 shows the typical configuration of a single stage slip ring assembly with a dual-gear assembly.

FIG. 3 shows said slip ring assembly 01 with said dual-gear assembly 11. Said gear 12 is engaged with said driving gear 201, and said gear 13 is engaged with said driven gear 203. For a single stage slip ring, usually the stator 205 is stationary. The rotor 202 is rotational. But if a dual-gear assembly 11 is added on said slip ring assembly 01 as shown in FIG. 3, when driving gear 201 and rotor 202 rotates at speed N1 rpm, said stator 205 will become rotational at speed N2 rpm. The speed ration, N2/N1, is dependent on the gear teeth numbers of said driving gear 201, gear 12, 13, and driven gear 203.

Figure 4:
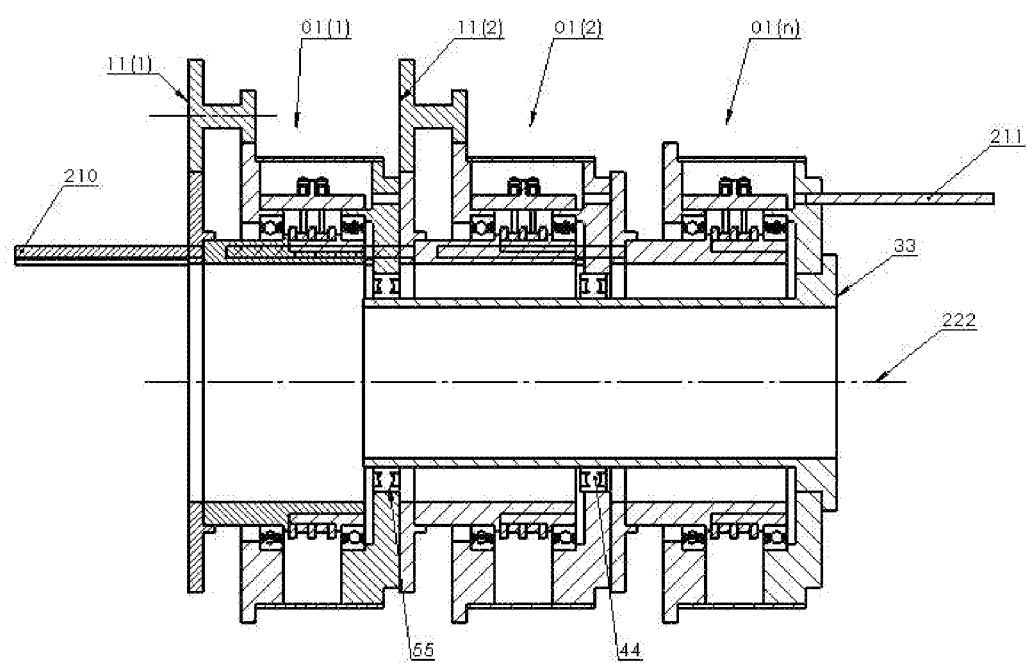
FIG. 4 is the preferred embodiment in the present invention for high speed applications.

FIG. 4 is the preferred embodiment in the present invention for high speed applications. It consists of multiple single stage slip ring assemblies 01(1), 01(2), . . . , 01(n), and multiple dual-gear assemblies 11(1), 11(2), . . . , so it's a multi-stage slip ring assembly, where multiple slip rings 01 are connected in series sequence. In other words, the stator in first stage is mechanically connected to the rotor of second stage. The stator in second stage is mechanically connected to the rotor of third stage. That means that the cable (see FIG. 1a) from the stator side of first stage will be connected to the cable on the rotor side of second stage and the cable from the stator side of second stage will be connected to the cable on the rotor side of third stage and so on. The stage quantity, n, can be any numbers. For an n-stage slip ring, there will be n of single stage slip ring 01. But the number of dual-gears will be n−1. That means that for the last stage, the stator is stationary. All other stators are rotational due to dual-gears. In FIG. 4, all the rotors and all the stators except the last stator are rotational around the axis 222. The part 33 is fixed with the last stator and supports the ball bearings 44 and 55 to enable the stators (except the last one) to rotate.

The basic idea is that by using gears, we can always can make sure the relative speed between the rotor and the stator in each stage is <=10000 rpm. For example, if the speed of the rotor is 30,000 rpm, by designing the gears (see FIG. 3), the speed of the stator can be 20,000 rpm, so the relative speed between the rotor and stator will be 10000 rpm.

If the gear ratio for Stage 1 is represented by the symbol $\lambda 1$, for Stage 2 is $\lambda 2$, . . . , the speed for the first rotor is represented by R1, for the second rotor R2. . . , for the last rotor is Rn, the speed for first stator is represented by S1, for the second stator S2, . . . , for the last stator Sn=0, then, the speed relations can be represented by the following equations:

$$S1 = R\lambda 1,$$

$$S2 = R2/\lambda 2, \ldots$$

$$R2 = S1, R3 = S2, \ldots$$

$$Rn = S(n-1).$$

The relative speed between rotor and stator for each stage is as follows:

$$R1-S1=R1(1-1/\lambda 1),$$

$$Rn-Sn=Rn(1-1/\lambda n).$$

For example: if R1=30,000 RPM, and λ1=1.5, then S1=20,000 RPM, so the relative speed between R1 and S1 is 10,000 RPM, which is considered good for a regular slip ring. Similarly, R2=S1=20,000 RPM, if λ2=2, then S2=R3=10,000 RPM. So for a 3-stage slip ring system, the relative speed between rotor and stator is always 10,000 RPM for each stage, which is good for a regular slip ring.

For another example: if R1=60,000 RPM, we will need a 6-stage slip ring system. By designing λ1=1.2, then S1=50,000 RPM, so the relative speed between R1 and S1 is 10,000 RPM. Similarly, R2=S1=50,000 RPM, by designing λ2=1.25, then S2=R3=40,000 RPM, . . . , and the last stator will be stationary.

Conclusion: for any high speed slip ring system, by selecting stage number n and designing gear ratios for each stage, we can always can make sure the relative speed between the rotor and the stator is <=10000 RPM for each stage, which is good for a regular slip ring.

The invention claimed is:

1. A slip ring system for high speed applications, comprising:
   first and second single stage slip rings;
   a first gear assembly connected to the first and second single stage slip rings,
   each of the first and second single stage slip rings further comprising:
      a ring assembly;
      a brush assembly;
      a ring holder for mounting ring assembly;
      a brush holder for mounting brush assembly;
      wherein the ring holder is rotatable relative to the brush holder;
   wherein the first and second single stage slip rings is connected in series sequence so that the brush holder in a first stage is mechanically connected to the ring holder of a second stage with the first gear assembly, and an output cable assembly of the first stage is connected with an input cable assembly of the second stage.

2. The slip ring system for high speed applications, according to claim 1, wherein each of said first and second single stage slip rings further includes: a driven gear on said brush holder, a driving gear on said ring holder, an input cable assembly soldered on said ring assembly, an output cable assembly soldered on said brush assembly; said gears, said ring holder and said brush holder being coaxially disposed on a common axis and rotatable around said common axis.

3. The slip ring system for high speed applications, according to claim 1, wherein the first gear assembly further includes: multiple gears having an input gear and an output gear, and a gear shaft to support said input and output gears; the input and output gears and the shaft being coaxially disposed on a common axis and rotatable around said common axis.

4. The slip ring system for high speed applications, according to claim 1, wherein said first single stage slip ring is engaged with said first gear assembly, wherein an input gear of said first gear assembly is engaged with a driving gear on said ring holder of said first single stage slip ring, and said output gear of said first gear assembly is engaged with a driven gear on said brush holder of said second single stage slip ring.

5. The slip ring system for high speed applications, according to claim 1, wherein said brush holder in a second stage being mechanically connected to said ring holder of a third stage, and said output cable assembly of the second stage being connected with said input cable assembly of the third stage.

6. The slip ring system for high speed applications, according to claim 1 further comprising a third single stage slip ring and a second gear assembly, the third single stage slip ring being connected in series sequence to the second single stage slip ring so that a brush holder in a second stage is mechanically connected to the ring holder of a third stage with the second gear assembly, and an output cable of the second stage is connected with an input cable assembly of the third stage.

7. The slip ring system for high speed applications, according to claim 1 comprising a plurality of single stage slip rings connected in series sequence with a plurality of gear assemblies.

* * * * *